(12) United States Patent
Pederson et al.

(10) Patent No.: US 11,635,160 B2
(45) Date of Patent: Apr. 25, 2023

(54) BOOM AIR SEAL

(71) Applicant: CNH Industrial America LLC, New Holland, PA (US)

(72) Inventors: Nicholas R. Pederson, Willmar, MN (US); John Paul Honermann, Benson, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 656 days.

(21) Appl. No.: 16/707,283

(22) Filed: Dec. 9, 2019

(65) Prior Publication Data
US 2021/0172550 A1    Jun. 10, 2021

(51) Int. Cl.
| | |
|---|---|
| F16L 21/035 | (2006.01) |
| F16L 21/03 | (2006.01) |
| F16L 37/091 | (2006.01) |
| F16L 37/084 | (2006.01) |
| F16C 11/06 | (2006.01) |
| F16L 27/04 | (2006.01) |
| F16L 37/092 | (2006.01) |

(52) U.S. Cl.
CPC .............. *F16L 21/03* (2013.01); *F16L 37/091* (2013.01); *B60G 2204/416* (2013.01); *F16C 11/0671* (2013.01); *F16C 2326/05* (2013.01); *F16L 27/04* (2013.01); *F16L 37/0845* (2013.01); *F16L 37/0925* (2013.01)

(58) Field of Classification Search
CPC ......... F16L 21/035; F16L 21/04; F16L 27/04; F16L 27/044; F16L 27/06; F16L 27/1025; F16L 37/02; F16L 37/025; F16L 37/04; A01C 7/082; A01C 7/081; A01C 7/206; A01B 73/02; A01B 73/04

USPC ................ 285/9.2, 184, 223, 237, 261, 271
See application file for complete search history.

(56) References Cited

U.S. PATENT DOCUMENTS

| | | | | |
|---|---|---|---|---|
| 1,780,693 A | * | 11/1930 | Yazel | ................. F16L 25/0018 285/302 |
| 3,073,609 A | * | 1/1963 | Hamilton | .............. F16L 21/035 277/603 |
| 3,994,514 A | | 11/1976 | Zimmerer et al. | |
| 4,569,486 A | | 2/1986 | Balmer | |

(Continued)

FOREIGN PATENT DOCUMENTS

DE            2025039 A1    12/1971

*Primary Examiner* — Aaron M Dunwoody
(74) *Attorney, Agent, or Firm* — Rebecca Henkel; Rickard DeMille (57) ABSTRACT

The invention provides an articulated joint in a pneumatic conveying system of a boom of an agricultural dry product applicator. The joint allows adjacent product-conveying tubes and respective joint components to articulate with respect to each other while maintaining a seal for pneumatically conveying product. Joint components may be separated from each other when the boom is folded while articulating with respect to each other without disengaging or creating potential leaks at segment junctures while the boom is extended. The articulated joint includes a rigid socket having a first socket section and a second socket section providing support to a compressible seal having a first seal section and a second seal section. The first seal section is inserted into the second socket section to create an airtight seal in between the first seal section and the second socket section even when boom tube segments flex during use.

9 Claims, 6 Drawing Sheets

(56) References Cited

U.S. PATENT DOCUMENTS

| | | | |
|---|---|---|---|
| 4,767,062 | A | 8/1988 | Fletcher |
| 4,834,004 | A | 5/1989 | Butuk et al. |
| 4,886,208 | A | 12/1989 | Strand |
| 4,917,408 | A | 4/1990 | Vidrine et al. |
| 5,125,583 | A | 6/1992 | Strand |
| 5,178,333 | A | 1/1993 | Barber et al. |
| 5,915,312 | A | 6/1999 | Meyer et al. |
| 8,925,977 | B2 | 1/2015 | Holmes et al. |
| 2005/0012329 | A1 | 1/2005 | Brown |
| 2018/0142815 | A1 | 5/2018 | Todd et al. |

* cited by examiner

BOOM AIR SEAL

FIELD OF THE INVENTION

The present invention pertains to a joint and, more specifically, to an articulated joint in a pneumatic conveying system of a dry or granular product applicator that may accommodate use-induced misalignments of adjacent tubes of the pneumatic conveying system while maintaining a substantially airtight seal between the adjacent tubes and can be separated into an unsealed state when folded for transportation.

BACKGROUND OF THE INVENTION

Agricultural product delivery systems are known to utilize various mechanisms, including mechanical and pneumatic systems to apply granular or particulate material or product, such as fertilizer, seed, insecticide or herbicide. Dry agricultural product applicators such as particulate product applicators are getting larger and faster to gain efficiency by allowing increased coverage in a single pass and in less time per pass. Even though the applicators and their booms are getting larger, they still need to be transportable.

Typically, applicators have foldable booms that can be folded-in to provide transport modes suitable for road transport. Foldable booms present challenges because the tube/pipes of pneumatic product conveyance systems must articulate during boom folding events. Some folding booms disengage tube segments from each other at boom folding joints or junctures to avoid bending the tube sharply. Disengaging-type tube segments can encounter numerous issues related to sealing and alignment in the dynamic systems of foldable booms, which get further complicated with increasing boom sizes. Even when aligned properly, the highly dynamic environment of large booms on fast applicators can create the flexing or bouncing of boom tribe segments, including at their folding joints, which can lead to momentary compromises of engagements of engageable and disengageable pneumatic components of the conveyance system. These engagement locations provide potential leak points that can decrease flow rate and correspondingly lead to inconsistent pneumatic flow characteristics and inconsistent product application. These momentary compromises may also happen when units are equipped with auto height control as the boom tip rises and drops to follow the contours of the field.

A need therefore exists to provide joints that allows equipment to be folded for transportation as well as accommodates for use-induced misalignments of adjacent tubes or segments of the equipment by reducing leak points at engagement locations.

SUMMARY OF THE INVENTION

The invention provides an articulated joint in an agricultural dry product pneumatic conveying system allowing equipment such as a boom to be folded for transportation by disengaging a ball and socket type seal arrangement, which reduces potential leaks at segment junctures during use by accommodating relative movement of ends of adjacent delivery tubes while maintaining sufficient seal integrity to avoid compromising delivery characteristics.

The articulated joints may be located and positioned in between boom tube segments, at foldable segment junctions or at segment junctions where the boom tube segments flex. In a first embodiment of an articulated joint, the articulated joint includes a seal and a socket. The seal includes a first seal section located and positioned at a first seal end and a second seal section located and positioned at the second seal end. The first seal section is preferably shaped similarly to a donut. The second seal section, on the other hand, includes a collar portion and a rim portion. Both the collar portion and the rim portion are preferably annular rings, with the rim portion having a larger outer diameter than the collar portion. The rim portion preferably projects away from the collar portion, towards the second seal end. The first seal section is further created from a compressible and flexible material.

The socket is created from a more rigid material than the seal and is shaped and sized so that it can support and engage the seal. The socket preferably has a first socket section located and positioned at the first socket end and a second socket section located and positioned at the second socket end. The first socket section is preferably an annular ring, while the second socket section is preferably shaped so that it is a cone-like structure.

The first socket section is integrally formed with a first boom tube segment (although the first socket section may just be attached or mounted to the first boom tube segment in other embodiments). In a preferred embodiment, the first boom tube segment is located and positioned further from a large wheeled transport unit than a second boom tube segment. The second boom tube segment is further inserted into the second seal section so that the second boom tube segment is adjacent to and abuts the rim portion and the collar portion of the seal. A partially tightened clamp may be placed so that it surrounds the collar portion to secure the seal to the second boom tube segment. The seal can be firmly placed into the socket so that the first seal section is adjacent to and abuts the second socket section. The first seal section preferably compresses against the second socket section so that a substantially airtight seal is created within the joint, where the clamp can then be fully tightened to retain the seal and socket engagement. The first seal section can therefore rotate within the second socket section and still retain its substantially airtight seal. In a preferred embodiment, but not limited to such, the air flows through the second boom tube segment attached to the seal before flowing into the first boom tube segment attached to the socket.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, certain embodiments of the present invention are shown in the drawings. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
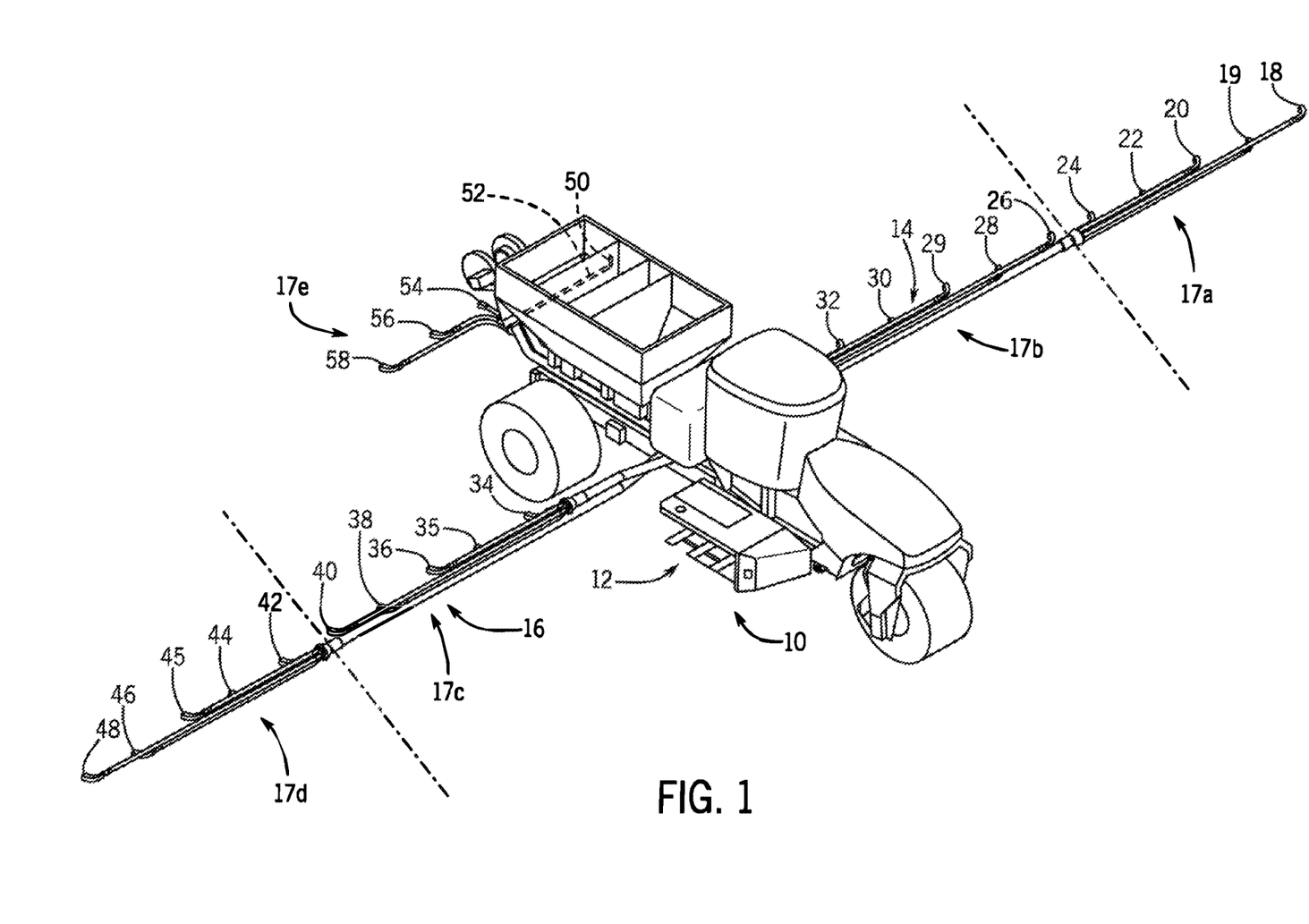
FIG. 1 illustrates an isometric view of an agricultural application implement, in the form of a dry granular applicator with an articulated joint in a pneumatic conveying system according to the present invention.

Referring now to the drawings, and more particularly to FIG. 1, there is shown an agricultural application implement 10, which could be a dry pneumatic granular applicator or an agricultural dry product applicator. As is known in the art, implement 10 generally includes a large wheeled transport unit 12 such as truck or tractor, and laterally extending particle delivery booms 14 and 16, which may be pivoted to a stowed position close to the implement 10 for storage or transport. Each boom 14, 16 extends laterally from the implement 10 in opposite directions. Each boom 14, 16 includes a plurality of boom sections 17, such as left outer and left inner boom sections 17A, 17B of boom 14, and right inner and right outer boom sections 17C, 17D of boom 16. Each boom section 17 is defined by a large diameter supply line 102 for supplying the boom section 17 with granular or particulate material, such as seed, fertilizer, herbicide, insecticide and the like.

Each boom section 17 includes a plurality of boom segments, tubes, or conduits 65 terminating at particle delivering units, which for the implement 10 are spreading outlets or nozzles. In the exemplary embodiment shown, left outer boom section 17A of boom 14 includes five nozzles 18, 19, 20, 22 and 24; left inner boom section 17B of boom 14 includes five nozzles 26, 28, 29, 30 and 32; right inner boom section 17C of boom 16 includes five nozzles 34, 35, 36, 38 and 40; and right outer boom section 17D of boom 16 includes five nozzles 42, 44, 45, 46 and 48.

Additionally, at the back of implement 10 there is a centrally mounted rear boom section 17E also defined by a large diameter supply line 102 for supplying the boom section with granular material. At the rear boom section 17E are five rear nozzles 50, 52, 54, 56 and 58 to provide full and complete coverage across the width of implement 10, including the area between the inboard-most nozzles 32 and 34 of booms 14, 16. The rear boom section 17E allows the spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention. For example, the five boom sections 17 may each have six nozzles per boom section 17.

Figure 2:
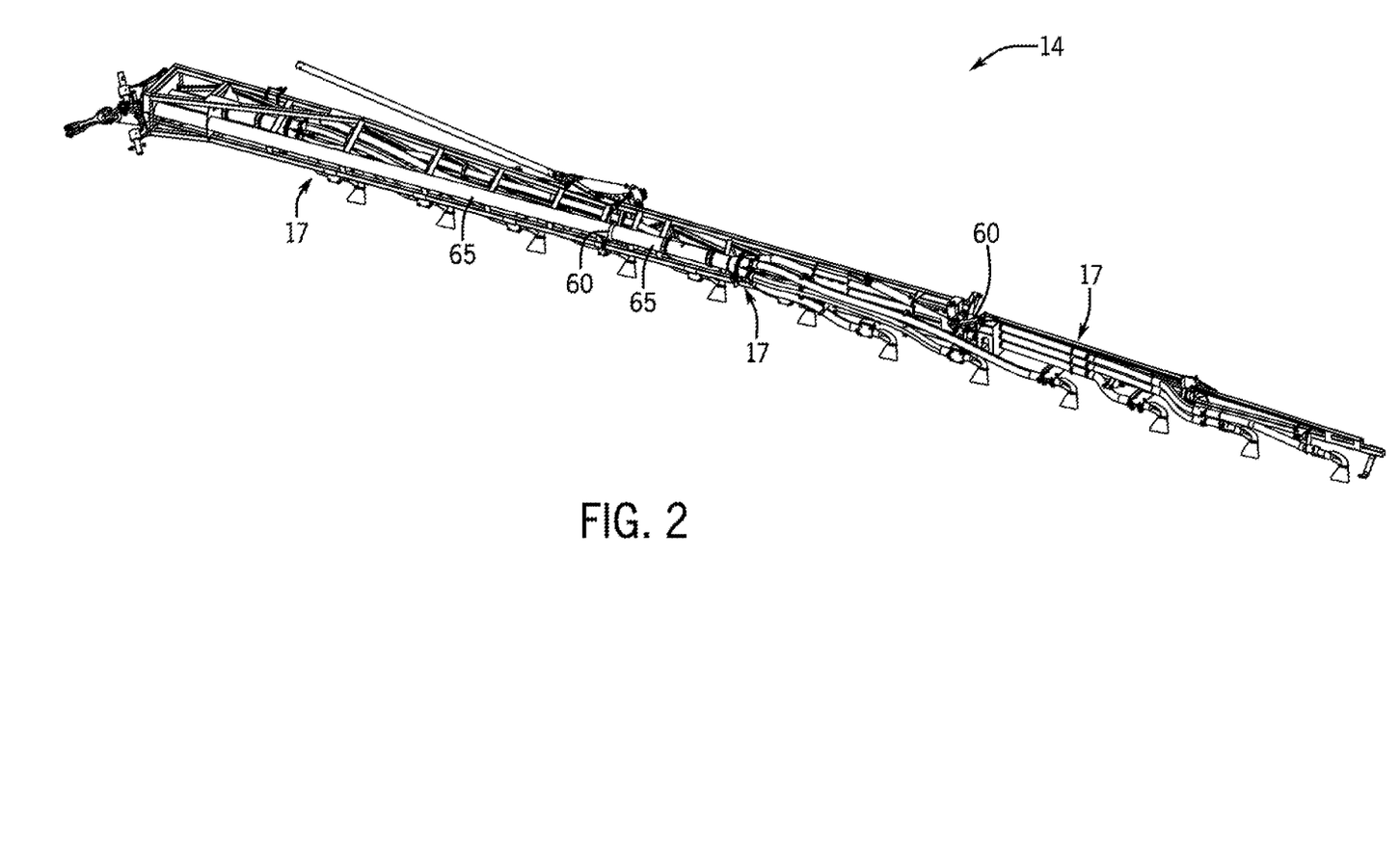
FIG. 2 illustrates an isometric view of a boom.
Figure 3:
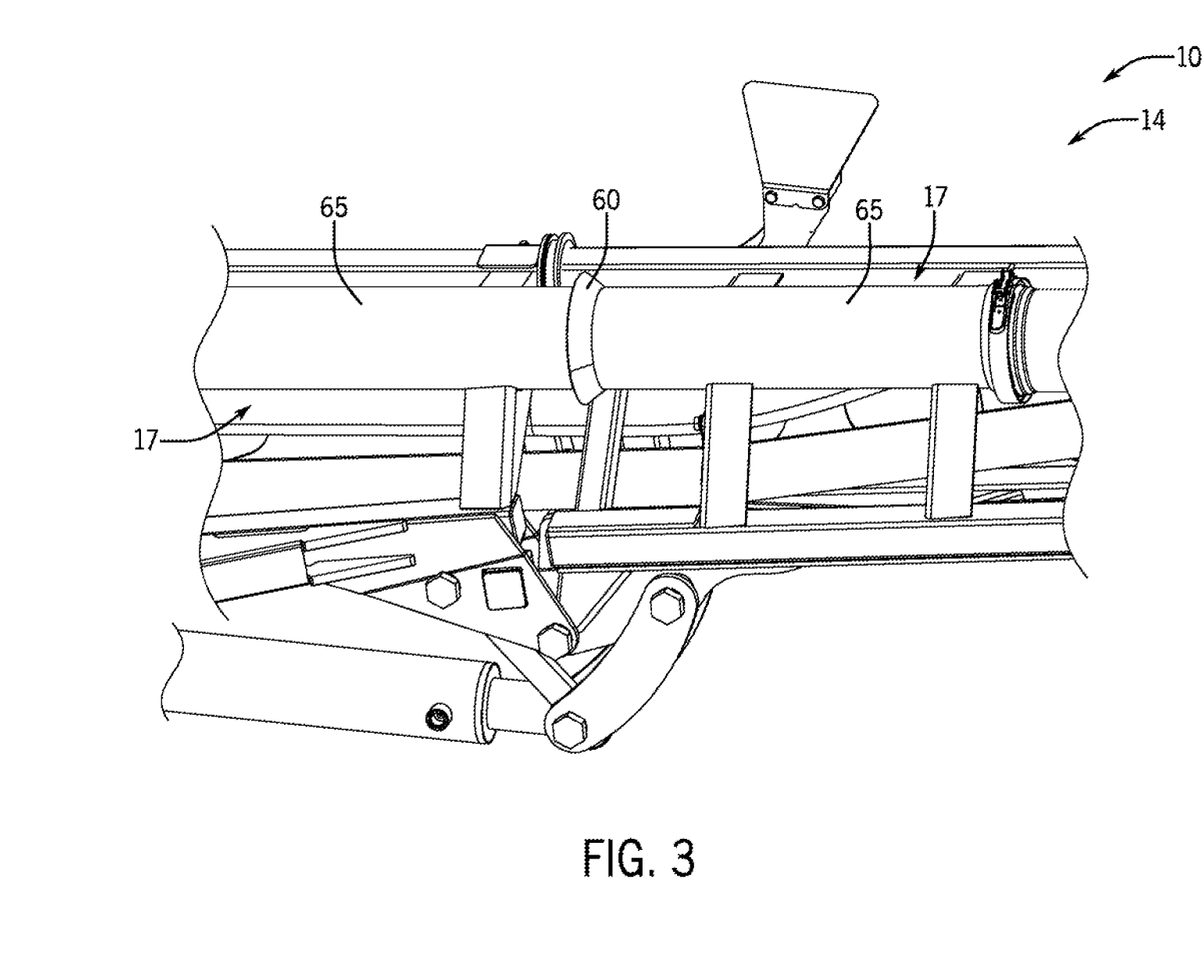
FIG. 3 illustrates an isometric view of a first embodiment of the articulated joint.

The length of the booms 14, 16, in conjunction with the rear boom section 17E, allow the agricultural application implement 10 to quickly and efficiently spread granular or particulate material onto the ground. However, the length of the booms 14, 16 makes them difficult to transport. The booms 14, 16 are therefore often pivotable and/or divided into boom sections 17 so that the booms 14, 16 may be folded for easier transportation, as illustrated in FIG. 2. At least one articulated joint 60 may be used at segment junctures so that the booms 14, 16 can be collapsed or folded by disengaging the boom tube segments 65, as well as reducing or eliminating leak points at segment junctures due to the flexing or bouncing of boom tube segments 17 when the implement 10 is in use as illustrated in FIG. 3.

Figure 4:
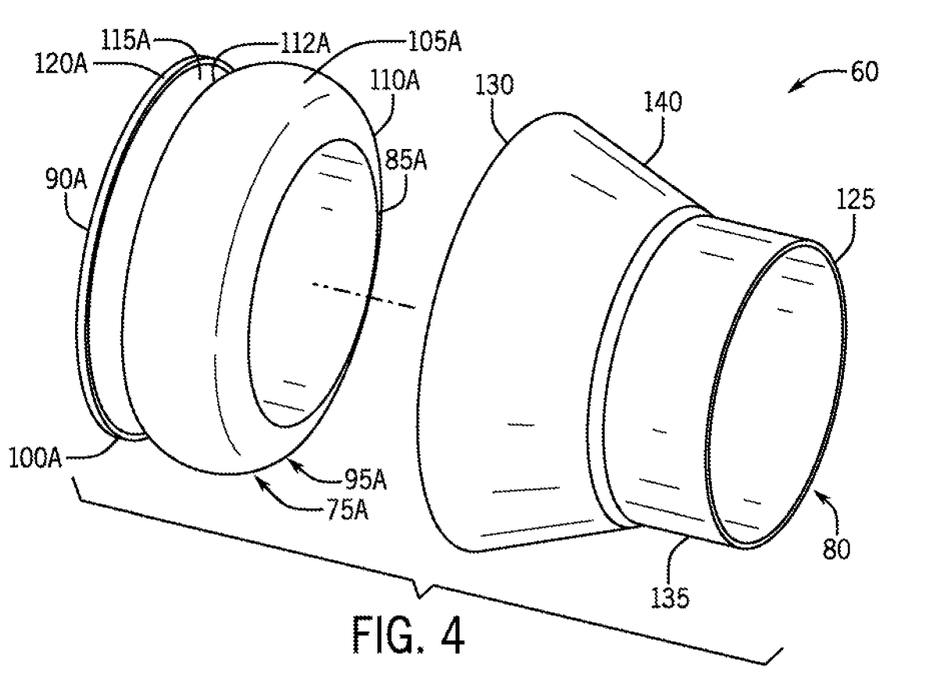
FIG. 4 illustrates an exploded isometric view of the first embodiment of the articulated joint of FIG. 3.
Figure 5:
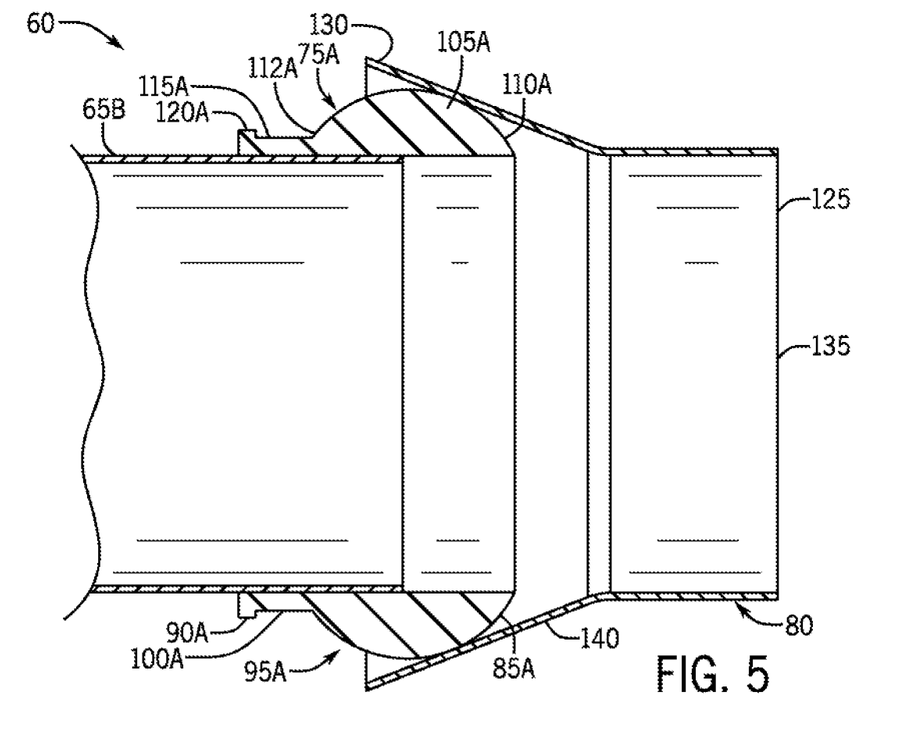
FIG. 5 illustrates a cross section view of the first embodiment of the articulated joint of FIGS. 3 and 4.

Referring to FIGS. 4 and 5, in a first embodiment of the at least one articulated joint 60, the joint 60 may include a seal 75A and a socket 80. The seal 75A and the socket 80 are preferably shaped and sized so that the seal 75A and socket 80 may form a ball and socket-like joint connection, as will be described in more detail hereinafter. The seal 75A includes a first seal end 85A and a second seal end 90A. The seal 75A may further include a first seal section 95A located and positioned, or arranged, at the first seal end 85A and a second seal section 100A located and positioned at the second seal end 90A, adjacent to and abutting the first seal section 95A. The first seal section 95A may be an annular ring with a width preferably wider at its center portion 105A before tapering inwardly at both a first edge portion 110A and a second edge portion 112A. The first seal section 95A therefore has a curved outer surface and is a donut-like shape in the current embodiment.

The second seal section 100A preferably projects away from the second edge portion 112A of the first seal section 95A, towards the second seal end 90A, forming a circular collar portion 115A. The second seal section 100A further includes a rim portion 120A which is preferably an annular ring that circumscribes and projects away from the collar portion 115A also towards the second seal end 90A. The second seal section 100A therefore forms a collar (rim portion 120A) with a step (collar portion 115A) connecting the rim portion 120A to the first seal section 95A, which may be a donut-like shape. The seal 75A, however, may be other shapes in alternative embodiments.

The socket 80 of the joint 60 has a first socket end 125 and a second socket end 130. A first socket section 135 is located and positioned, or arranged, at the first socket end 125, while a second socket section 140 is located and positioned at the second socket end 130. In a first embodiment, the first socket section 135 may be an annular ring with substantially the same diameter throughout its length. The second socket section 140 is adjacent to and projects away from the first socket section 135 towards the second socket end 130. The second socket section 140 preferably gradually tapers outwards as the second socket section 140 extends towards the second socket end 130, thereby forming a cone-like collar. The second socket section 140 therefore may have a cone-like shape that extends from and has a larger diameter than the annular ring-like body of the first socket section 135, and presents a tapering surface that faces the seal 75A. The second socket section 140 is shaped and sized so that the seal 75A may be inserted into the second socket section 140 and form a substantially airtight seal as will be described in more detail hereinafter.

Referring to FIG. 5, to form the joint 60, the first seal end 85A of the seal 75A is inserted through the second socket end 130 of the socket 80 and into the second socket section 140. The curved surface of the first seal section 95A of the seal 75A is therefore able to selectively engage the socket 80. The seal 75A is flexible and compressible, while the socket 80 is more rigid than the seal 75A. The flexibility and compressibility of the seal 75A allows the seal 75A to be tightly and more deeply placed into the second seal section 140 of the socket 80 to create a substantially airtight seal. The rigidity of the socket 80, on the other hand, provides the seal 75A support and structure when the seal 75A is compressed within the socket 80. The seal 75A is compressible and rotatable with respect to the socket 80. In greater detail, the compressibility and malleability of the seal 75A and the rigidity and support of the socket 80 allows the seal 75A and socket 80 to pivot and flex while engaged without creating leak points because the flexible seal 75A is capable of rotating, moving, and Shifting as needed to retain a substantially airtight seal within the joint 60. Thus, while an example embodiment of the seal 75A and socket 80 is described above, either or both the seal 75A and socket 80 could have different structures as long as the flexible seal 75A is able to engage with the stiffer socket 80 to create a substantially airtight seal. In one embodiment, the seal 75A may be formed from a polyurethane material and lubricant which enables the seal 75A to be compressible, while the socket 80 may be formed from stainless steel material which enables the socket 80 to be rigid. Both the seal 75A and the socket 80 may be formed out of other materials in alternative embodiments.

Figure 6:
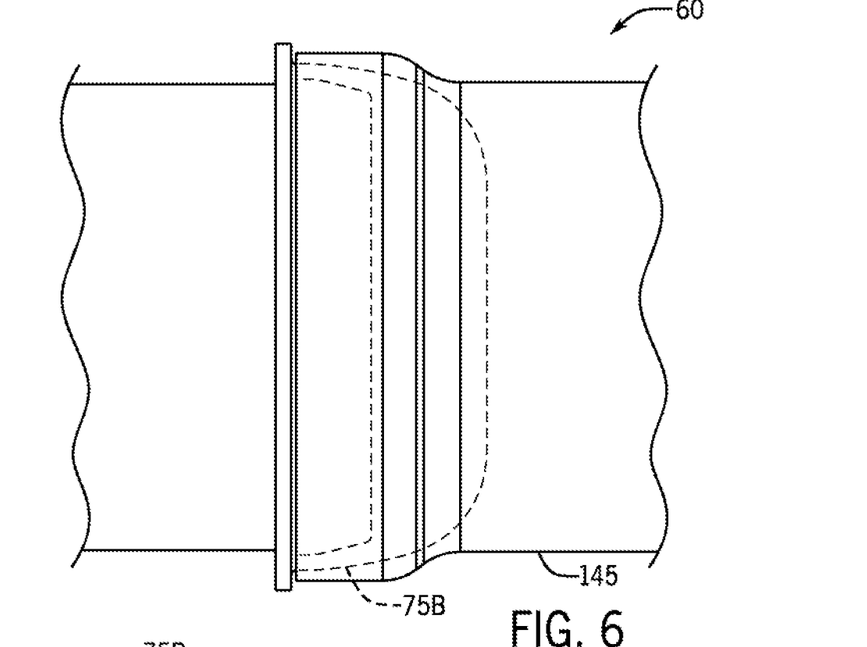
FIG. 6 illustrates an isometric view of a second embodiment of the articulated joint.
Figure 7:
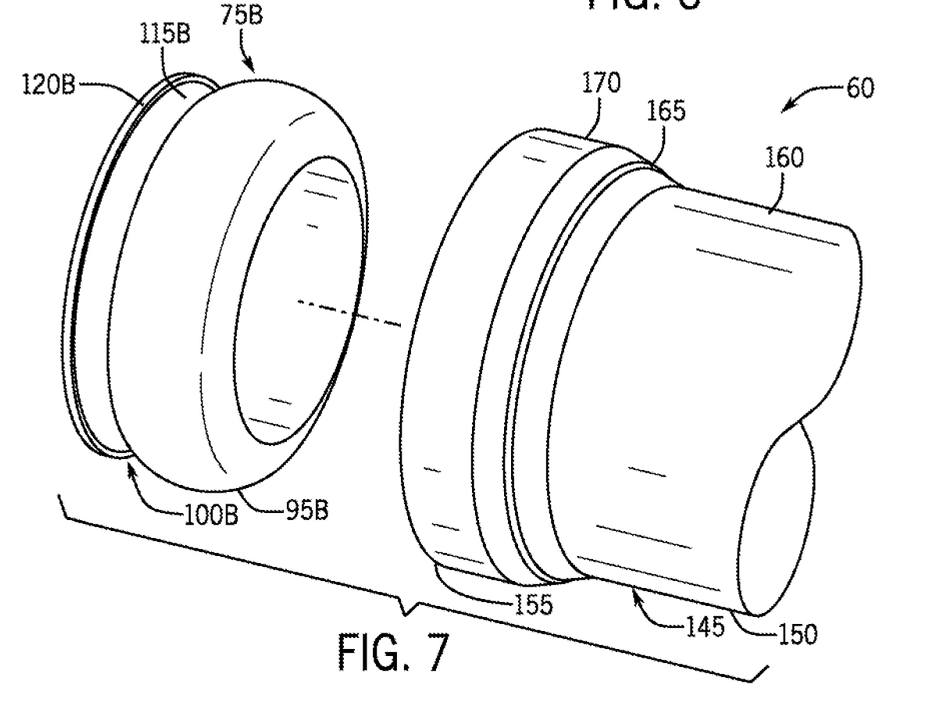
FIG. 7 illustrates an exploded isometric view of the second embodiment of the articulated joint of FIG. 6.

In a second embodiment of the joint 60, the joint 60 also forms a ball and socket-like joint connection illustrated in FIG. 6. Turning to FIG. 7, in the second embodiment of the joint 60, the second embodiment of the joint 60 includes a seal 75B and a joint socket 145. The seal 75B is substantially similar to the seal 75A of the first embodiment of the joint 60. As in the first embodiment, the seal 75B includes a donut-like first seal section 95B and a second seal section 100B, which includes a circular collar portion 115B and an annular ring 120B projecting away from the collar portion 115B.

The joint socket 145 of the second embodiment of the joint 60, on the other hand, differs from the socket 80 of the first embodiment. In the second embodiment, the joint socket 145 has a first joint socket end 150 and a second joint socket end 155. The joint socket 145 includes a first socket portion 160, a socket shoulder portion 165, and a second socket portion 170. The first socket portion 160 is located and positioned at the first joint socket end 150. The first socket portion 160 is preferably an annular ring with substantially the same diameter throughout. As the first socket portion 160 extends towards the second joint socket end 155, the first socket portion 160 transitions into the socket shoulder portion 165, which tapers radially outwards from the first socket portion 160. The socket shoulder portion 165 is preferably located and positioned adjacent to and abuts both the first socket portion 160 and the second socket portion 170. The second socket portion 170 is preferably also an annular ring or collar portion that projects from the shoulder socket portion 165.

Figure 8:
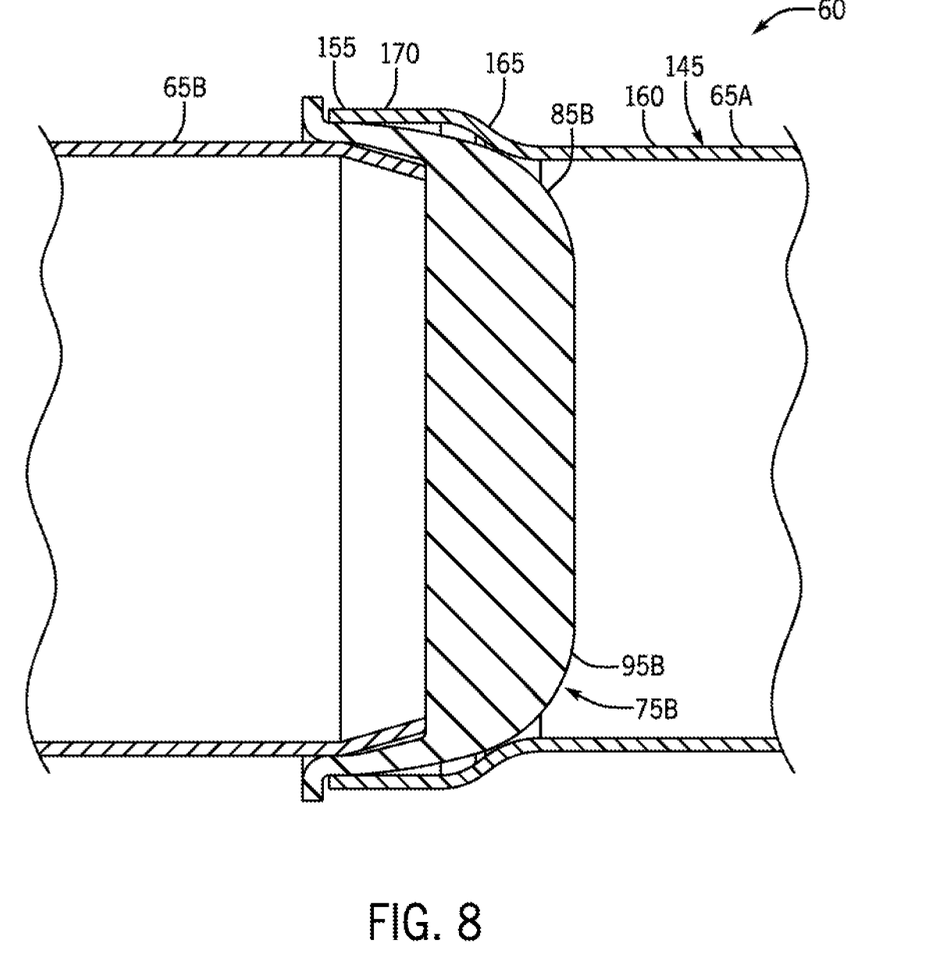
FIG. 8 illustrates a cross section view of the second embodiment of the articulated joint of FIGS. 6 and 7.

Turning to FIG. 8, like the first embodiment of the joint 60, the second embodiment of the joint 60 can be assembled by inserting the first seal end 85B of the seal 75B through the second joint socket end 155 of the joint socket 145 so that the first seal section 95B abuts both the socket shoulder portion 165 and the second socket portion 170, and is further adjacent to the first socket portion 160. The seal 75B of the second embodiment of the joint 60 is also compressible, while the joint socket 145 is rigid. The seal 75B can therefore be compressed against the joint socket 145 and form a substantially airtight seal within the joint 60 even when the boom 14, 16 flexes while in use.

In order to assemble the boom 14, 16 with at least one joint 60, a first boom tube segment 65A may be inserted into the first socket section 135/first socket portion 160 to attach or mount the first boom tube segment 65A to the socket 80/joint socket 145 as illustrated in FIG. 8. The first socket section 135/first socket portion 160 is an annular ring that fits concentrically with respect to the first boom tube segment 65A. The socket 80/joint socket 145 may be welded onto or integrally formed with the first boom tube segment 65A. Other methods of attaching or mounting the socket 80/joint socket 145 to the boom tube segment 65 are envisioned and foreseeable.

A second boom tube segment 65B is inserted into the second seal section 100A/B so that the boom tube segment 65B is adjacent to and abuts the first seal section 95 as illustrated in FIGS. 5 and 8. The seal 75A/B therefore extends radially from an outer circumferential surface of the second boom tube segment 65B, as well as extends longitudinally beyond an end of the second boom tube segment 65B. A clamp (not shown) can be placed and partially tightened around the collar portion 115A/B, between the first seal section 95A/B and the rim portion 120A/B of the second seal section 100A/B. The boom 14, 16 is then preferably fully extended outwards. The seal 75A/B can then be fully inserted into the second socket section 140/second socket portion 170 before the clamp is fully tightened around the collar portion 115A/B to secure or mount the seal 75A/B to the boom tube segment 65B and within the socket 80/joint socket 145. The joint 60 therefore has a substantially airtight seal when the boom 14, 16 is fully extended. Further, the center line of the joint 60 is preferably directly on the pivot of the boom 14, 16 so that boom 14, 16 movement causes the seal 75A/B to rotate within the socket 80/joint socket 145. Therefore, once the boom 14, 16 has been fully assembled with at least one joint 60, the boom 14, 16 can be used without leak points forming at segment junctures in between boom tube segments 65. Moreover, the seal 75A/B within the socket 80/joint socket 145 forms a sealed engagement when the boom is unfolded during use.

In a preferred embodiment, the joint 60 is further oriented so that the second tube segment 65B attached to the seal 75B is located closer to the large wheeled transport unit 12 (shown in FIG. 1) than the socket 80 or joint socket 145 attached to the first tube segment 65A. The air therefore flows through the second tube segment 65B before flowing through the first tube segment 65A. However, in other embodiments, the air may flow through the first tube segment 65A before flowing through the second tube segment 65B. The seal 75A/B is further removed or separated from within the socket 80/joint socket 145 when the boom is folded for transportation.

Although the best modes contemplated by the inventors of carrying out the present invention are disclosed above, practice of the above invention is not limited thereto. It will be manifest that various additions, modifications and rearrangements of the features of the present invention may be made without deviating from the spirit and the scope of the underlying inventive concept.

What is claimed is:
1. An agricultural application implement comprising:
    a frame including at least one boom capable of being folded for transportation, the at least one boom including a series of boom tube segments with at least two boom tube segments being connected by a joint, the joint comprising:
    a seal and a socket;

wherein the seal defines a compressible seal body and includes a first seal section and a second seal section, the second seal section having a collar portion and a rim portion;

wherein the socket defines a rigid socket body and includes a first socket section and a second socket section;

wherein the first seal section and second socket section are configured so that the first seal section and second socket section are engaged when the boom is extended during use and separated when the boom is folded for transportation; and wherein the least two boom tube segments include:

a first boom tube segment with the socket mounted to a first boom tube segment;

a second boom tube segment with the seal mounted to a second boom tube segment, the seal and socket being selectively engageable to create a substantially airtight joint between the first boom tube segment and the second boom tube segment when the boom is extended during use.

2. The agricultural application implement of claim 1, wherein the first boom tube segment is integrally formed with the socket.

3. The agricultural application implement of claim 1, wherein the seal is made from a polyurethane material.

4. The agricultural application implement of claim 1, wherein the socket is made from a stainless steel material.

5. The agricultural application implement of claim 1, wherein the first seal section of the seal is an annular ring that tapers inwardly at a first edge and a second edge.

6. The agricultural application implement of claim 1, wherein the first socket section is an annular ring that fits concentrically with respect to the first boom tube segment.

7. The agricultural application implement of claim 1, wherein the second socket section is a cone shape that presents a tapering surface that faces the seal.

8. The agricultural application implement of claim 1, wherein the seal extends radially from an outer circumferential surface of the second boom tube segment.

9. The agricultural application implement of claim 8, wherein the seal extends longitudinally beyond an end of the second boom tube segment.

* * * * *